Patented June 15, 1937

2,083,619

UNITED STATES PATENT OFFICE 2,083,619

METHOD FOR THE PREPARATION OF AZO DYES

Erik Schirm, Dessau in Anhalt, Germany, assignor to General Aniline Works Inc., New York, N. Y., a corporation of Delaware No Drawing. Application June 28, 1934, Serial No. 732,829. In Germany June 28, 1933

4 Claims. (Cl. 8—5)

This invention relates to the preparation of azo dyes and to certain azo and diazo components capable of alteration of addition to produce valuable dyestuffs.

Broadly the present invention comprises the discovery that those aromatic amino compounds which possess the following general structural formula are very valuable diazo components.

In connection with this formula $R\!\!>\!\!C$ indicates a mono- or poly-nuclear, heterocyclic ring system having a tertiary, double bond nitrogen atom, preferably in an α- or γ-position with respect to the carbon atom attached to the side chain; X indicates a hydrogen atom or an optional organic radical joined through a carbon atom, and R' means an aromatic radical which apart from being substituted by the amino group may also be substituted by any one or combination of a number of different atoms or radicals, for example, halogen, nitro, hydroxyl, alkoxyl and the like. The amino group can be joined with respect to the binding place of the aromatic residue R', in an ortho-, meta- or para-position. A substituent in an o- or p-position with relation to the amino group increases here, as also in other respects, the fastness of the dyestuffs to acid.

One of the simplest examples of the compounds having the composition mentioned above, already known as such, is the m'- (or p'-) amino α-stilbazol of the formula

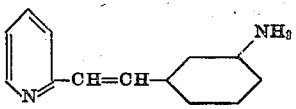

A number of different compounds within the scope of the invention are, for example, subsequently reduced condensation products from o-, m- or p-nitrobenzaldehyde, o- or p-chloro-m-nitrobenzaldehyde, nitro-anisyl aldehyde, nitro-piperonal and others, on the one hand and containing the R' end of the molecule; α- or γ-picoline, lutidine, collidine, α-benzyl pyridine, quinaldine, µ-alkyl benzimidazol µ-alkyl benzoxazol, µ-alkyl benzothiazol, 1-phenyl-3,5-dimethyl-pyrazol, 4,6-dimethyl- or 2, 4, 6-trimethyl-pyrimidine, 2,5-dimethylpyrazine, 9-methylacridine or 9-methylphenanthridine or the sulfonic acids of the latter, on the other hand, and containing the R end of the molecule. However, compounds of of the aforementioned constitution can also be obtained, for example, by condensing m- or p-nitro cinnamic aldehyde with acetoacetic- or oxalacetic ester in the presence of ammonia ("Hantzsch'sche Pyridinsynthese"), oxidation of the obtained hydropyridine derivative into the pyridine derivative, eventually saponifying the carboxylic acid esters and finally reducing the nitro group, or they may be formed by condensation of m- or p- nitro-cinnamic acid with o-phenylene diamine or o-aminophenol or o-aminothiophenol, by which procedure also derivatives of the benzimidazol, benzoxazol, benzothiazol, respectively, develop and reduction of the nitro group takes place.

All of the aforementioned condensation methods are already known. The compounds obtainable by these methods which are appropriate for the purposes of the invention involved are also in part known, but up to the present time it has not been possible to get any positive or satisfactory results.

The particular value of the new diazo components, in a great measure producible in a simple and inexpensive manner, results from the fact that they produce unusually strong "substantiveness" in the azo dyes obtained by their help, so that without further treatment the simple monoazo dyes possess a fully sufficient affinity toward the cellulose fiber. Up to the present time this result is attained only by a very few diazo components. This result is doubtless attributable to the strongly unsaturated nature of the cyclic nitrogen containing radical which is connected in a closed system of conjugated double bonds and which contains a particularly strongly "substantivating" aliphatic double bond. Yet, this effect was not to be anticipated without experimentation, since compounds of the type involved hitherto have not been employed as components of azo dyes. Where secondary diazo dyes are joined with the new diazo component in an "initial position", the substantivity would presumably be still stronger than in connection with the mono-azo dyes and the assumption has proven to be correct with primary diazo dyes consisting of 2 molecules of the new diazo components and 1 molecule of an azo component capable of double coupling or substitution.

However, many of the new dyestuffs are also very well absorbed by animal fibers and are excellent for the dyeing of mixed textures composed of cellulose and animal fibers.

A further advantage of the new diazo components results from the fact that they yield dyestuffs which are fast to acid and to alkali. This property is surprising inasmuch as the basicity and the unsaturated state of the cyclic nitrogen radical would lead one to believe that halochromy would occur, and bring about a color change during the treatment of the dyestuffs or its complete dyeing with acids, as is the case with Congo red.

From an economic point of view, it is important that the heterocyclic compounds, which may be the basic or raw material for the formation of the diazo components employed according to the invention is not necessarily used in a pure form, for also inexpensive commercial mixtures, which contain the desired compounds either in mixtures among themselves and/or with other substances are or can be made useful for the present purpose. The best known and perhaps also commercially most important one of these mixtures is the pyridine-base mixture obtained from coal tar. However, synthetically obtained mixtures of pyridine-bases also may be used. Therefore it may be said that those mixtures can be employed as the heterocyclic molecule-part of the new diazo component, which as a result of their particular constitution, are able to exert an influence upon the degree of substantivity of the finished azo dye, but scarcely upon the color tone.

Naturally, it is possible that azo dyes produced with the help of the new diazo components, so far as they are diazotizable or do couple with diazo compounds, may be further developed on the fiber in the customary way after the redye.

Furthermore, the new diazo components can also advantageously be employed for obtaining the so-called "ice colors" which process is carried out in such a way that the fiber is bottomed in an alkaline bath with the customary azo components like β-naphthol, 2,3-hydroxynaphthoic acid arylides, acetoacetic arylides or the like, the dyeing then being developed in a second bath which contains the diazo compounds of the bases utilized according to the present invention as well as buffer substances like acetates, carbonates or the like. Of value here is the very good stability of the dissolved diazo compounds of the new diazo components as well as those which exist in a solid form stabilized according to known methods.

Furthermore certain monoazo dyes are very valuable for the development of tub-fast dyes on the fiber in the manner of the ice colors which dyes are obtained from the herein proposed new diazo components by coupling with such so-called "Intermediate components" which do not contain solubility-rendering groups, thus e. g. with m-toluidine, p-xylidine, 1-methyl-3-amino-4-alkoxybenzol, aminohydrochinon-dialkylether, α-naphthylamine, 1-amino-2, alkoxynaphthalene and others. The particular value of these monoazo dyes results from the fact that they, contrary to the monoazo dyes up to now customarily used for ice colors, as e. g. aminoazobenzol, o-phenetidine→α-naphthyl-amine or similar compounds form salts which are easily soluble in water and are therefore conveniently diazotizable. Also the manufacture of stable diazo preparations, which may take place according to known methods, is thus made much easier.

Example 1

151 parts of m-nitrobenzaldehyde with 200 parts of a dry commercial mixture pyridine base obtained from coal tar, which boils between 128 and 145° C., after an addition of 150 parts of acetic acid anhydride are boiled in a reflux condenser until no aldehyde is detectable in the reaction mixture, which process requires several hours. Then the unreacted part of the pyridine base is distilled off together with the excess acetic acid anhydride and the acetic acid developed during the reaction, the distillation being suitably carried out under reduced pressure. The residue, mainly consisting of m'-nitro-α-stilbazol with an admixture of m'-nitro-γ-stilbazol is dissolved in 2000 parts of warm alcohol of 95% strength. To this solution the warm solution of about 145 parts of commercial sodium sulfide containing 60% Na₂S and 36 parts of sulfur in 150 parts of water is added. After cessation of the active reaction the solution is heated a short time thereby boiling the alcohol. The solution is then diluted with about a fivefold volume of water, whereby the reaction product is separated as a thick liquid. The latter is washed with water and after drying is distilled under a reduced pressure. The resulting mixture of m'-amino-α-stilbazol and m'-amino-γ-stilbazol, distills over in a vacuum produced by a water jet pump, at around 200° C. The yield is very good. The reduction can also very well take place with zinc dust in glacial acetic acid or in pyridine in the presence of acids.

196 parts of the amino stilbazol mixture obtained as mentioned above (in the place of which naturally also the pure compounds may be used) are dissolved in 2000 parts of water and 400 parts of hydrochloric acid of 20° Bé. strength; the solution is cooled to 0-5° and at this temperature it is diazotized with 69 parts of sodium nitrite dissolved in 300 parts of water. The clear diazo solution is then slowly introduced into an ice-cold solution of 250 parts of 2-amino-5-naphthol-7-sulfonic acid and 400 parts of calcined soda or soda ash in 8000 parts of water. After the mass is stirred for about 1 to 2 hours in the cold, it is heated up to 60°, salted out filtered and dried. The dyestuff obtained is almost up to the theoretical yield.

The dyestuff produces a reddish-orange color which is quite fast to acid and entirely fast to alkali, if dyed on cotton in the customary way using a soda-alkaline salt bath. It is diazotizable on the fiber and can then be further developed with β-naphthol, m-phenylene-diamine, phenyl-methyl-pyrazolone or the like. If wool is treated with the dyestuff in a sodium acetate compounded bath, it gives an orange color to the wool; the dye is fast to soda and acetic acid and is reddened by diluted mineral acids.

Example 2

196 parts of p'-amino-γ-stilbazol are diazotized according to the directions set out in Example 1. The diazo solution thus obtained is mixed with an ice-cold solution, which has been prepared by dissolving 143 parts of α-naphthylamine in 120-parts of hydrochloric acid of 20° Bé. strength and 5000 parts of water followed by cooling. A concentrated, aqueous solution of 400 parts of crystallized sodium acetate is added and stirred until the reaction is completed. The mass is now rendered alkaline with soda or concentrated ammoniacal liquor and is filtered to separate the precipitate which is of orange color and which melts together in a resin-like manner during heating. The dye base is rinsed with water and dried. Corresponding to its mode of formation it has the following constitutional formula:

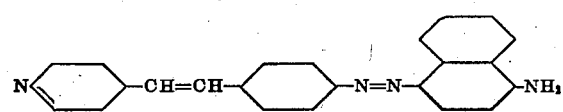

2 parts of the aforementioned amino azo compound are dissolved in 50 parts of water using as much hydrochloric acid as is necessary to dissolve the whole mass, but which will not do more than just blacken Congo paper. The solution is diluted with 1500 parts of water, heated to 60° and compounded with 20 parts of common salt. Now 100 parts of cotton to be dyed are introduced into the bath and under a gradual increase of temperature up to 80° are kept in the dye liquor until no further increase in depth of color can be observed. The cotton is then rinsed cold, wrung and introduced into an ice-cold diazotizing bath consisting of 2 parts of sodium nitrite, 20 parts of 10% hydrochloric acid and 20 parts of common salt, dissolved in 1500 parts of water. It is left therein for about 30 minutes, rinsed cold and then treated in a bath which in 1000 parts by volume contains 2 parts of β-naphthol in caustic soda solution. The resulting dye is a violet, fast to washing.

*Example 3*

196 parts of m' amino-α-stilbazol are diazotized according to Example 1. In a separate container 250 parts of the sodium salt of 1-aminonaphthalene-6-sulfonic acid and 300 parts of crystallized sodium acetate are dissolved in 4000 parts of water and the solution is cooled to about 5°. Now the diazo solution is introduced and stirred in the cold until the combination is completed. Thereafter the mass is diluted with 10,000 parts of water after which it is rendered just alkaline with concentrated soda lye. It is then heated up until the dyestuff is completely dissolved, is filtered off from impurities formed and is finally separated from the filtrate by addition of about 2000 parts of common salt. After being cooled to room temperature the dyestuff is filtered off and washed with 15% common salt solution. The dyestuff paste is dissolved in about 15,000 parts of water while hot, the solution then being cooled to about 4° after 69 parts of sodium nitrite have been introduced. About 1200 parts of common salt are next added to the cold dyestuff suspension. After dissolution has taken place, 480 parts of fuming hydrochloric acid (38% HCl) are quickly added, whereby at first a color change toward violet takes place. With the progressive diazotization, which requires about 1 to 2 hours for its completion, the color changes toward light brown. The precipitated azodiazo compound is filtered off as quickly as possible, washed again with diluted salt water, mixed with 12,000 parts of water, the resulting diazo suspension being slowly introduced while stirring, into an ice-cold solution of 250 parts of 2-amino-8-naphthol-6-sulfonic acid and 250 parts of calcined soda in 4000 parts of water. The mass is stirred 12 hours, then heated up to 50° and mixed with 2000 parts of common salt by stirring, which causes the formed diazo dye already heated to become fully precipitated. The precipitate is then filtered, covered with some salt solution of 10% strength, exhausted by suction or blown as dry as possible and finally dried entirely by a moderate heating. The dyestuff yield is very good.

Using a soda-alkaline salt bath, the dyestuff colors cotton a deep blue gray tone, and with greater concentration of the dye bath, the tone becomes black. The dye can be diazotized on the fiber in the usual way, and with m-phenylenediamine it can be developed into a deep-black. With β-naphthol a very dark blue is obtained. Wool treated therewith in an acid bath is colored black.

*Example 4*

Cotton is grounded in the usual manner with a caustic alkaline solution of 10 g. of 2.3-oxynaphthoic acid-β-naphthalide to the liter, which may contain the customary additions like formaldehyde, Turkey red oil or other wetting-out and leveling agents. The grounded material, damp or after intermediate drying, is now introduced to a developing bath. This is produced by means of diazotizing m'-amino-α-stilbazol according to Example 1, the mineral acid is then neutralized with sodium acetate and the diazo solution diluted to a concentration of about 10 g. of amine to each liter of solution. For each 3 g. of 2.3-oxynaphthoic acid-β-naphthalide, 2 g. of amino stilbazol are used. After carrying the grounded material through the developing bath, a scarlet red, which is quite fast to washing, to rubbing and to light, is obtained. The dyeing is completed by means of rinsing, soaping and repeated rinsing.

*Example 5*

Cotton is grounded in the same way as described in Example 4. For the development is used a diazo solution which has been obtained by diazotizing m'-amino-α-stilbazol (compare Example 1), coupling with a α-naphthylamine and diazotizing the obtained amino-azo dyestuff as mentioned in Example 2. When the diazotization is completed, which requires a long time, the free mineral acid is neutralized with sodium acetate as usual, diluted with ice water to a content of about 15 g. of amino-azo-base to the liter after which the grounded cotton is introduced. The dyeing thus obtained is fast to washing and is violet in color.

I claim:

1. Method for the preparation of azo dyestuffs comprising diazotizing an aromatic amino compound corresponding to the general formula

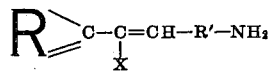

in connection with which <img> indicates a mono- or polynuclear, heterocyclic ring system having a tertiary, double bond nitrogen atom, in which the side chain is attached to a carbon atom preferably in alpha or gamma position; wherein X stands for a hydrogen atom or an optional organic radical joined through a carbon atom and R' for a phenylene group, which, apart from the diazotizable amino group, can also be substituted by other atoms or radicals of the group consisting of halogen, nitro, hydroxyl, alkoxyl etc., which do not disturb the diazotization, and coupling the diazo compound obtained with a coupling component.

2. Method for the preparation of azo dyes according to claim 1 characterized in that the dyestuff formation takes place on the fiber in such a manner that the same is preliminarily treated with an azo component and that then the dyeing is thereafter accomplished by treating the sized fiber with a diazo compound of an amino substance described in claim 1.

3. A process of preparing azo dyes according to claim 1 wherein the dyestuff formation takes place on the fiber, comprising preliminarily treating the fiber with an azo component, then treating the fiber with a diazotized amino azo dye containing an intermediate component which does not contain groups which render the molecule water soluble.

4. Azo dyestuffs corresponding to the general formula

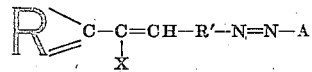

wherein $\mathrm{R{=}C}$ denotes a mono- or polynuclear heterocyclic ring system having a tertiary, double bond nitrogen atom, X denotes a hydrogen atom or an organic radical joined through a carbon atom, and R' denotes a phenylene radical which may or may not be substituted by an atom or radical of the group consisting of halogen, nitro, hydroxyl, alkoxyl and wherein A stands for a radical of an organic compound capable of being coupled with the indicated diazo component.

ERIK SCHIRM.